(12) United States Patent
Suzuki et al.

(10) Patent No.: US 8,098,084 B2
(45) Date of Patent: Jan. 17, 2012

(54) TRANSMISSION APPARATUS FOR DIFFERENTIAL COMMUNICATION

(75) Inventors: Youichirou Suzuki, Nishio (JP); Noboru Maeda, Chiryu (JP); Shigeki Takahashi, Okazaki (JP); Takahisa Koyasu, Chita (JP); Kazuyoshi Nagase, Kitanagoya (JP); Tomohisa Kishigami, Obu (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 12/902,255

(22) Filed: Oct. 12, 2010

(65) Prior Publication Data
US 2011/0084730 A1    Apr. 14, 2011

(30) Foreign Application Priority Data
Oct. 13, 2009  (JP) ................................ 2009-236301

(51) Int. Cl.
*H03K 19/094* (2006.01)
*H03K 19/20* (2006.01)
*H03K 19/003* (2006.01)
*H03K 3/00* (2006.01)
*H03B 1/00* (2006.01)

(52) U.S. Cl. ............. 326/86; 326/30; 326/115; 327/108
(58) Field of Classification Search .............. 326/21, 326/30, 31, 82, 83, 86, 87, 115, 119, 121; 327/108, 109, 170, 172–176
See application file for complete search history.

(56) References Cited

U.S. PATENT DOCUMENTS

| | | | | |
|---|---|---|---|---|
| 5,739,707 | A | * | 4/1998 | Barraclough ................. 327/112 |
| 7,205,787 | B1 | * | 4/2007 | Massoumi et al. .............. 326/30 |
| 7,795,919 | B2 | * | 9/2010 | Fujiwara ........................ 326/87 |
| 2004/0169526 | A1 | | 9/2004 | Komatsu |
| 2011/0169547 | A1 | * | 7/2011 | Suzuki et al. ................. 327/384 |

FOREIGN PATENT DOCUMENTS

| | | |
|---|---|---|
| JP | 2002-261241 A | 9/2002 |
| JP | 2003-134813 A | 5/2003 |
| JP | 2007-318734 A | 12/2007 |

* cited by examiner

*Primary Examiner* — Shawki Ismail
*Assistant Examiner* — Dylan White
(74) *Attorney, Agent, or Firm* — Posz Law Group, PLC

(57) ABSTRACT

A transmission apparatus for differential communication includes a driver bridge circuit and a pair of noise protection circuits. The driver bridge circuit includes four output devices that are independently connected between each of a pair of transmission lines and a power line or a ground line. Each noise protection circuit is provided to a corresponding transmission lines. Each noise protection circuit includes a ground potential detector and an impedance controller. The ground potential detector detects a potential of the corresponding transmission line with respect to the ground line. The impedance controller causes an impedance of the corresponding transmission line with respect to the ground line to become equal to an impedance of the other transmission line with respect to the ground line, when the detected potential becomes outside a predetermined potential range.

6 Claims, 12 Drawing Sheets

TRANSMISSION APPARATUS FOR DIFFERENTIAL COMMUNICATION

CROSS REFERENCE TO RELATED APPLICATION

This application is based on and incorporates herein by reference Japanese Patent Application No.2009-236301 filed on Oct. 13, 2009.

FIELD OF THE INVENTION

The present invention relates to a transmission apparatus for differential transmission of data through a pair of transmission lines.

BACKGROUND OF THE INVENTION

A conventional transmission apparatus for differential communication includes a driver bridge circuit having a four output devices. The four output devices are independently connected between each of a pair of transmission lines and a power line or a ground line. Two output devices connected to one transmission line are paired to form a first output device pair, and the other two output devices connected to the other transmission line are paired to form a second output device pair. The first and second output device pairs are alternately turned ON and OFF in accordance with data so that differential transmission of data can be achieved.

In the conventional transmission apparatus, potentials of the transmission lines rise or fall, when common mode noise beyond a power supply-voltage range is superimposed on the transmission lines. In this case, even when one output device pair is turned ON, electric current does not flow through one output device of the one output device pair. As a result, the differential transmission of data cannot be achieved normally.

Therefore, measures to reduce common mode noise are taken in the conventional transmission apparatus.

For example, a common mode choke coil is added to the transmission lines. However, since the common mode choke coil are formed with a magnetic core and windings, the apparatus as a whole is increased in size.

JP 2007-318734A and U.S. 2004/0169526 corresponding to JP 2004-253859A disclose an apparatus for reducing common mode noise without using a common mode choke coil. In the apparatus disclosed in U.S. 2004/0169526, a filter circuit for selectively passing common mode noise is provided between a transmission line and a ground line. In the apparatus disclosed in JP 2004-253859A, a common mode potential of transmission lines is measured, and when the measured common mode potential exceeds a threshold potential, output current supplied from a driver bridge circuit to the transmission lines is corrected by a current correction circuit so that a desired differential output can be obtained regardless of the common mode potential For example, a filter circuit used in the apparatus disclosed in JP 2007-318734A can be formed with resistors and capacitors. In such a case, a waveform of a differential communication signal to be transmitted may be affected by the filter circuit. To prevent this problem, the filter circuit may be formed with a mutual inductance element having a magnetic core wound with a conductor. However, in such a case, the apparatus as a whole is increased in size.

In the apparatus disclosed in U.S. 2004/0169526, since the current correction circuit can be incorporated in the driver bridge circuit, the apparatus can be simplified in configuration without increasing the size.

However, in the apparatus disclosed in U.S. 2004/0169526, a series circuit of two resistors is provided between a pair of transmission lines, and a potential between the resistors is measured as a common mode potential. Therefore, the resistors need to have high impedance in order not to affect a differential voltage between the transmission lines.

When the resistors have high impedance, a time constant, which depends on resistances of the resistor and capacitances between the transmission lines and the ground line, becomes large. As a result, speed for detecting the common mode potential becomes slow. Therefore, for example, it is impossible to follow or track high speed common mode noise with a rising edge of about 100 MHz.

Further, in the apparatus disclosed in U.S. 2004/0169526, the current correction circuit includes a comparator for detecting the common mode potential. The comparator may degrade current correction responsivity.

SUMMARY OF THE INVENTION

In view of the above, it is an object of the present invention to provide a differential communication transmission apparatus for reducing disturbance in a differential output waveform without delay in response by promptly detecting common mode noise superimposed on transmission lines.

According to an aspect of the present invention, a transmission apparatus for differential communication includes a driver bridge circuit and a noise reduction circuit. The driver bridge circuit includes first, second, third, and fourth output devices. The first output device is connected between a first transmission line and a power line supplied with a power-supply voltage from a direct current power supply. The second output device is connected between the first transmission line and a ground line. The third output device is connected between the power line and a second transmission line. The fourth output device is connected between the second transmission line and the ground line. The first and fourth output devices are paired to form a first output device pair. The second and third output devices are paired to from a second output device pair. The first and second output device pairs are alternately tuned ON and OFF in accordance with transmission data so that differential transmission of the transmission data can be performed through the first and second transmission lines. The noise reduction device reduces noise superimposed on the first and second transmission dines. The noise reduction device includes a pair of noise protection circuits. Each noise protection circuit is provided to a corresponding one of the first and second transmission lines. Each noise protection circuit includes a ground potential detector and an impedance controller. The ground potential detector detects a potential of the corresponding transmission line with respect to the ground line. The impedance controller causes an impedance of the corresponding transmission line with respect to the ground line to become equal to an impedance of the other transmission line with respect to the ground line, when the detected potential becomes outside a predetermined potential range of from a lower potential limit to an upper potential limit that are set based on the power-supply voltage.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

Figure 1:
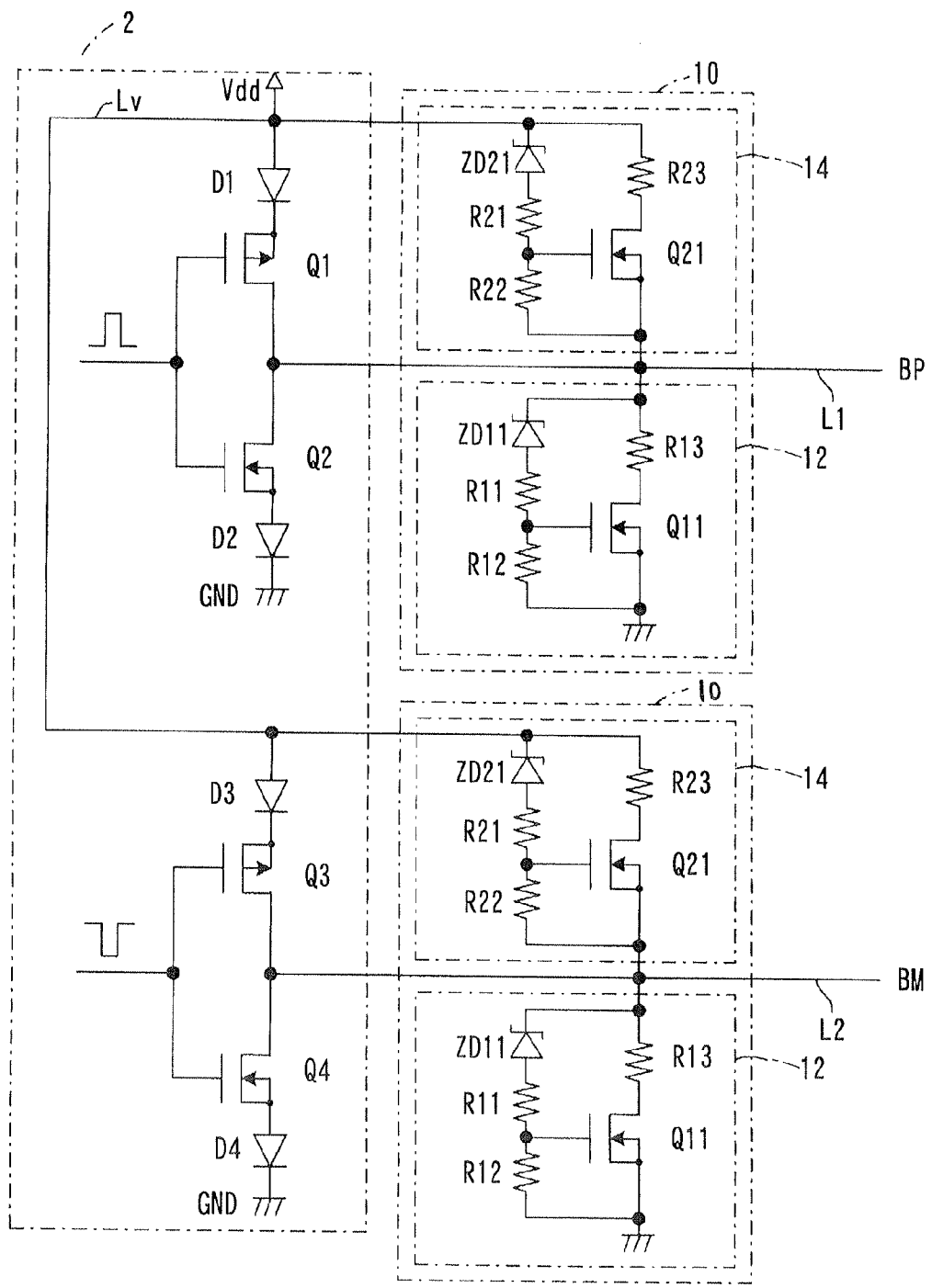
FIG. 1 is a diagram illustrating an electrical schematic of a differential communication transmission apparatus according to a first embodiment of the present invention.

Embodiments of the present invention are described below with reference to the drawings.

First Embodiment

A differential communication transmission apparatus according to a first embodiment of the present invention is described below with reference to FIG. 1. The differential communication transmission apparatus is used for differential transmission of data to be transmitted through a pair of transmission lines L1, L2. The differential communication transmission apparatus includes a driver bridge circuit 2 and a pair of noise protection circuits 10. One of the pair of noise protection circuits 10 is provided to the transmission line L1, and the other of the pair of noise protection circuits 10 is provided to the transmission line L2.

The driver bridge circuit 2 includes P-channel MOSFETs Q1, Q3 and N-channel MOSFETs Q2, Q4. The MOSFET Q1 is connected between a power line Lv and the transmission line L1. The MOSFET Q3 is connected between the power line Lv and the transmission line L2. The MOSFET Q2 is connected between the transmission line L1 and a ground line GND. The MOSFET Q4 is connected between the transmission line L2 and ground line GND. The power line Lv is connected to a positive side of a direct-current (DC) power supply, and the ground line GND is connected to a negative side of the DC power supply.

The MOSFETs Q1-Q4 can serve as output devices. Drains of the MOSFETs Q1, Q3 are connected to the transmission lines L1, L2, respectively. Sources of the MOSFETs Q1, Q3 are connected to the power line Lv through diodes D1, D3, respectively. Drains of the N-channel MOSFETs Q2, Q4 are connected to the transmission lines L1, L2, respectively. Sources of the MOSFETs Q2, Q4 are connected to the ground line GND through diodes D2, D4, respectively.

Anodes of the diodes D1, D3 are connected to the power line Lv. Cathodes of the diodes D1, D3 are connected to the sources of the MOSFETs Q1, Q3, respectively. Thus, the diodes D1, D2 are forward biased so that electric currents can flow from the power line Lv to the transmission lines L1, L2, respectively. Cathodes of the diodes D2, D4 are connected to the ground line GND. Anodes of the diodes D2, D4 are connected to the sources of the MOSFETs Q2, Q4, respectively. Thus, the diodes D2, D4 are forward biased so that electric currents can flow from the transmission lines L1, L2 to the ground line GND, respectively.

A transmission signal having a high level or a low level according to a value "1" or "0" of transmission data is inputted to a gate of each of the MOSFETs Q1, Q2, which are connected to the transmission line L1. An inversion signal of the transmission signal is inputted to a gate of each of the MOSFETs Q3, Q4, which are connected to the transmission line L2.

Thus, in the driver bridge circuit 2, a first MOSFET pair having the MOSFETs Q1, Q4 and a second MOSFET pair having the MOSFETs Q2, Q3 are alternately turned ON and OFF according to the value "1" or "0" of transmission data. Therefore, a polarity of a voltage between the transmission lines L1, L2 is inverted according to the value "1" or "0" of transmission data so that differential transmission of data can be achieved through the transmission lines L1, L2.

Each of the pair of the noise protection circuits 10, which is independently provided to the transmission lines L1, L2, serves as a noise reduction device. Each of the pair of the noise protection circuits 10 has the same configuration. As an example, configuration and operation of the noise protection circuit 10 provided to the transmission line L1 are described below.

The noise protection circuit 10 includes a positive noise protection circuit 12 and a negative noise protection circuit 14. The positive noise protection circuit 12 is connected between the transmission line L1 and the ground line GND to reduce noise having a potential higher than a potential of the power line Lv. The negative noise protection circuit 14 is connected between the power line Lv and the transmission line L1 to reduce noise having a potential lower than a potential of the ground line GND.

The positive noise protection circuit 12 includes a Zener diode ZD11, resistors R11-R13, and a N-channel MOSFET Q11. A cathode of the Zener diode ZD11 is connected to the transmission line L1. The resistors R11, R12 are connected in series between an anode of the Zener diode ZD11 and the ground line GND. A gate of the MOSFET Q11 is connected to a node between the resistors R11, R12. A source of the MOSFET Q11 is connected to the ground line GND. A drain of the MOSFET Q11 is connected through the resistor R13 to the transmission line L1.

Thus, in the positive noise protection circuit 12, the MOSFET Q11 is kept OFF until a potential of the transmission line L1 reaches an upper limit potential with respect to the ground line GND as a reference potential of 0V. The upper limit potential depends on a breakdown voltage of the Zener diode ZD11.

When the potential of the transmission line L1 exceeds the upper limit potential, electric current flows through the Zener diode ZD11 and the resistors R11, R12. As a result, a voltage across the resistor R12 exceeds a threshold voltage of the MOSFET Q11, and the MOSFET Q11 is turned ON.

The breakdown voltage of the Zener diode ZD11 is set so that electric current can flow through the resistors R11, R12 to turn ON the MOSFET Q11 when the potential of the transmission line L1 exceeds the upper limit potential that is equal to or slightly greater than the potential of the power line Lv.

When the MOSFET Q11 is OFF, electric current paths in the positive noise protection circuit 12 are completely interrupted so that the positive noise protection circuit 12 cannot affect an impedance of the transmission line L1 with respect to the ground line GND. In contrast, when the MOSFET Q11 is ON, electric current flows through an electric current path formed with the Zener diode ZD11 and the resistors R11, R12 and an electric current path formed with the resistor R13 and the MOSFET Q11, so that the impedance of the transmission line L1 with respect to the ground line GND can depend on a combined resistance of the electric current paths.

According to the first embodiment, resistances of the resistors R11-R13 are set so that the impedance of the transmission line L1 with respect to the ground line GND during the ON-state of the MOSFET Q11 can be equal to a combined impedance of the MOSFET Q4 and the diode D4 with respect to the ground line GND. It is noted that the MOSFET Q4 and the diode D4 allow the other transmission line L2 to be connected to the ground line GND.

Therefore, for example, if positive common mode noise beyond a power-supply voltage range of from 0 to Vdd is superimposed on the transmission lines L1, L2 under the conditions that the MOSFETS Q1, Q4 of the driver bridge circuit 2 are ON and that the MOSFETs Q2, Q3 of the driver bridge circuit 2 are OFF, the positive noise protection circuit 12 causes the impedance of the transmission line L1 with respect to the ground line GND to become equal to the impedance of the transmission line L2 with respect to the ground line GND so that the driver bridge circuit 2 can achieve differential transmission of data normally.

That is, generally, if common mode noise having a potential higher than the power line Lv is superimposed on the transmission lines L1, L2 under the conditions that the MOSFETS Q1, Q4 are ON and that the MOSFETs Q2, Q3 are OFF, electric current does not flow from the power line Lv to the transmission line L1 through the MOSFET Q1 so that the transmission line L1 will become open-circuited. As a result, the impedances of the transmission lines L1, L2 with respect to the ground line GND become unbalanced so that differential transmission of data cannot be achieved normally. In such a case, according to the first embodiment, since the positive noise protection circuit 12 serves to cause the impedance of the transmission line L1 with respect to the ground line GND to become equal to the impedance of the transmission line L2 with respect to the ground line GND, differential transmission of data can be achieved normally.

The negative noise protection circuit 14 includes a Zener diode ZD21, resistors R21-R23, and a N-channel MOSFET Q21. A cathode of the Zener diode ZD21 is connected to the power line Lv. The resistors R21, R22 are connected in series between an anode of the Zener diode ZD21 and the transmission line L1. A gate of the MOSFET Q21 is connected to a node between the resistors R21, R22. A source of the MOSFET Q21 is connected to the transmission line L1. A drain of the MOSFET Q21 is connected through the resistor R23 to the power line Lv.

Thus, in the negative noise protection circuit 14, the MOSFET Q21 is kept OFF until a potential of the transmission line L1 reaches a lower limit potential with respect to the power line Lv as a reference potential of 0V. The lower limit potential depends on a breakdown voltage of the Zener diode ZD21.

When the potential of the transmission line L1 falls below the lower limit potential, electric current flows through the Zener diode ZD21 and the resistors R21, R22. As a result, a voltage across the resistor R22 exceeds a threshold voltage of the MOSFET Q21, and the MOSFET Q21 is turned ON.

The breakdown voltage of the Zener diode ZD21 is set so that electric current can flow through the resistors R21, R22 to turn ON the MOSFET Q21 when the potential of the transmission line L1 falls below the lower limit potential that is equal to or slightly lower than the potential of the ground line GND.

When the MOSFET Q21 is OFF, electric current paths in the negative noise protection circuit 14 are completely interrupted so that the negative noise protection circuit 14 cannot affect the impedance of the transmission line L1 with respect to the ground line GND. In contrast, when the MOSFET Q21 is ON, electric current flows through an electric current path formed with the Zener diode ZD21 and the resistors R21, R22 and an electric current path formed with the resistor R23 and the MOSFET Q21, so that the impedance of the transmission line L1 with respect to the ground line GND can depend on a combined resistance of the electric current paths.

According to the first embodiment, resistances of the resistors R21-R23 are set so that the impedance of the transmission line L1 with respect to the ground line GND during the ON-state of the MOSFET Q21 can be equal to a combined impedance of the MOSFET Q3 and the diode D3 with respect to the ground line GND. It is noted that the MOSFET Q3 and the diode D3 allow the other transmission line L2 to be connected to the power line Lv.

Therefore, for example, if negative common mode noise below the power-supply voltage range of from 0 to Vdd is superimposed on the transmission lines L1, L2 under the conditions that the MOSFETS Q2, Q3 of the driver bridge circuit 2 are ON and that the MOSFETs Q1, Q4 of the driver bridge circuit 2 are OFF, the negative noise protection circuit 14 causes the impedance of the transmission line L1 with respect to the ground line GND to be equal to the impedance of the transmission line L2 with respect to the ground line GND so that the driver bridge circuit 2 can achieve differential transmission of data normally.

That is, generally, if common mode noise having a potential lower than the ground line GND is superimposed on the transmission lines L1, L2 under the conditions that the MOSFETS Q2, Q3 are ON and that the MOSFETs Q1, Q4 are OFF, electric current does not flow from the transmission line L1 to the ground line Lv through the MOSFET Q2 so that the transmission line L1 will become open-circuited. As a result, the impedances of the transmission lines L1, L2 with respect to the ground line GND become unbalanced so that differential transmission of data cannot be achieved normally. In such a case, according to the first embodiment, since the negative noise protection circuit 14 serves to cause the impedance of the transmission line L1 with respect to the ground line GND to become equal to the impedance of the transmission line L2 with respect to the ground line GND, differential transmission of data can be achieved normally.

As mentioned previously, each of the pair of the noise protection circuits 10 has the same configuration. Therefore, the noise protection circuit 10 provided to the transmission line L2 can operate in the same manner as discussed above for the noise protection circuit 10 provided to the transmission line L1.

Thus, in the differential communication transmission apparatus according to the first embodiment, even if a potential of one of the transmission lines L1, L2 becomes higher than the power line Lv or becomes lower than the ground line GND during data transmission due to common mode noise superimposed on the transmission lines L1, L2, the noise protection circuit 10 provided to the one of the transmission lines L1, L2 causes the impedance of the one of the transmission lines L1, L2 with respect to the ground line GND to become equal to the impedance of the other of the transmission lines L1, L2 with respect to the ground line GND. In such an approach, the potential of each of the transmission lines L1, L2 is kept within the predetermined potential range corresponding to the power-supply voltage so that the driver bridge circuit 2 can achieve differential transmission of data normally.

As mentioned previously, in the conventional apparatus disclosed in JP 2004-253859A, a series circuit of resistors is provided between the transmission lines, and a potential at the midpoint of the series circuit is detected as a common mode potential. In contrast, in the differential communication transmission apparatus according to the first embodiment, the potential of each of the transmission lines L1, L2 is detected. Then, when the measured potential becomes outside the predetermined potential range that is set based on the power line Lv and the ground line GND, the impedances of the transmission lines L1, L2 with respect to the ground line GND are controlled.

Thus, according to the first embodiment, there is no need that the circuit used for potential detention (i.e., the circuit formed with the Zener diode ZD11 and the resistors R11, R12, or the circuit formed with the Zener diode ZD21 and the resistors R21, R22) has high impedance. Accordingly, rise and fall in the potential of the transmission lines L1, L2 due to common mode noise can be detected promptly so that the MOSFETs Q11, Q21 used for impedance control can be driven at high speed.

Further, since there is no need to add a common mode choke coil or a filter circuit for attenuating common mode noise to the transmission lines L1, L2, the differential communication transmission apparatus as a whole can be reduced in size.

The Zener diode ZD11 and the resistors R11, R12 of the positive noise protection circuit 12 and the Zener diode ZD21 and the resistors R21, R22 of the negative noise protection circuit 14 can serve as a ground potential detector. The resistor R13 and the MOSFET Q11 of the positive noise protection circuit 12 and the resistor R23 and the MOSFET Q21 of the negative noise protection circuit 14 can serve as an impedance controller.

The present inventors have conducted a simulation to measure a differential communication voltage that is obtained at a receiver side when common mode noise beyond the power-supply voltage range of from 0 to Vdd is superimposed on the transmission lines L1, L2 during differential data transmission that is performed by using the differential communication transmission apparatus according to the first embodiment. The result of the simulation is shown in FIGS. 2A and 2B.

Figure 3:
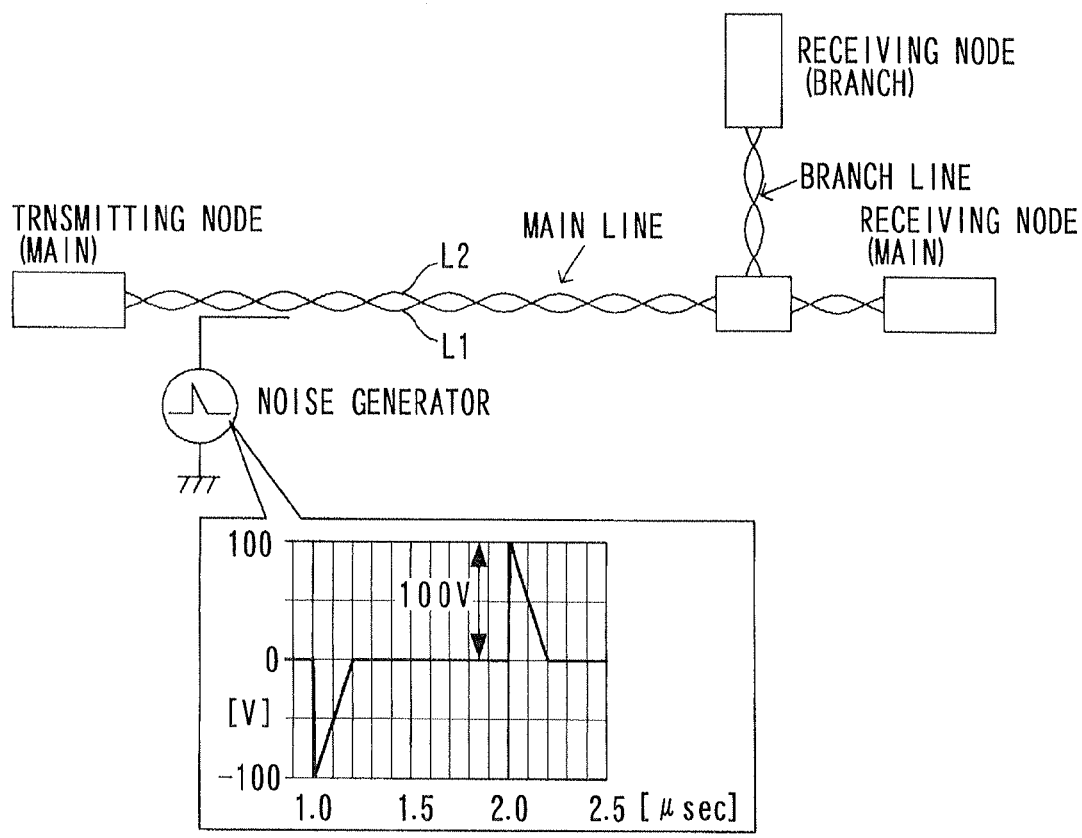
FIG. 3 is a diagram illustrating a system used for the simulation.

FIG. 3 illustrates a communication system used in the simulation. In the communication system, the differential communication transmission apparatus according to the first embodiment is used as a transmitting node, and the transmission lines L1, L2 connected to the transmitting node are used as a main line. A first receiving node is connected to an end of the main line, and a second receiving node is connected to an end of a branch line branching from the main line. Common mode noise of plus and minus 100 volts is introduced into the main line from a noise generator at a constant frequency. In the simulation, a differential communication voltage, which is received by the first receiving node when the transmitting node transmits transmission data with an alternating value, was measured.

Figure 2A:
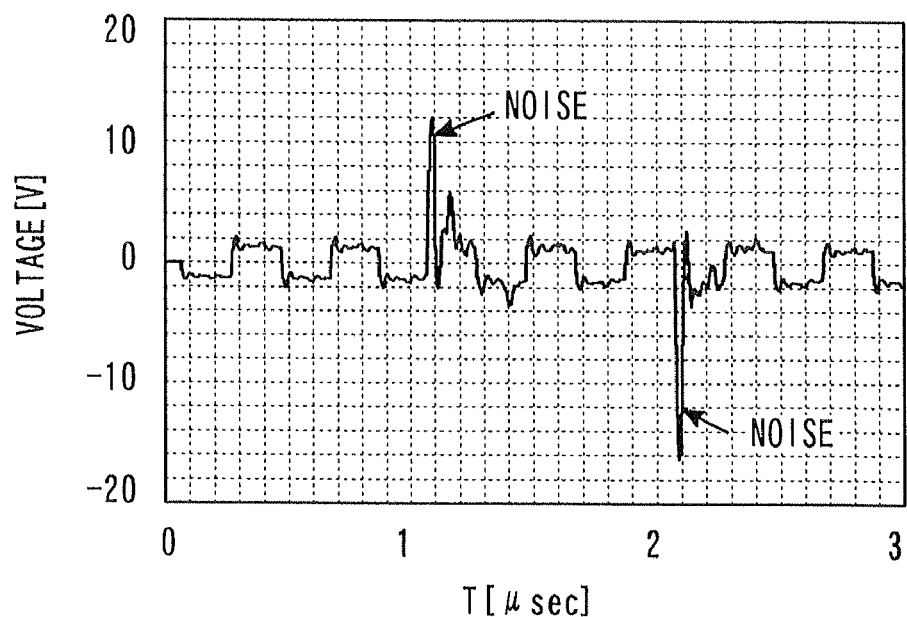
FIGS. 2A and 2B are diagrams illustrating a result of simulation conducted by the present inventors.
Figure 2B:
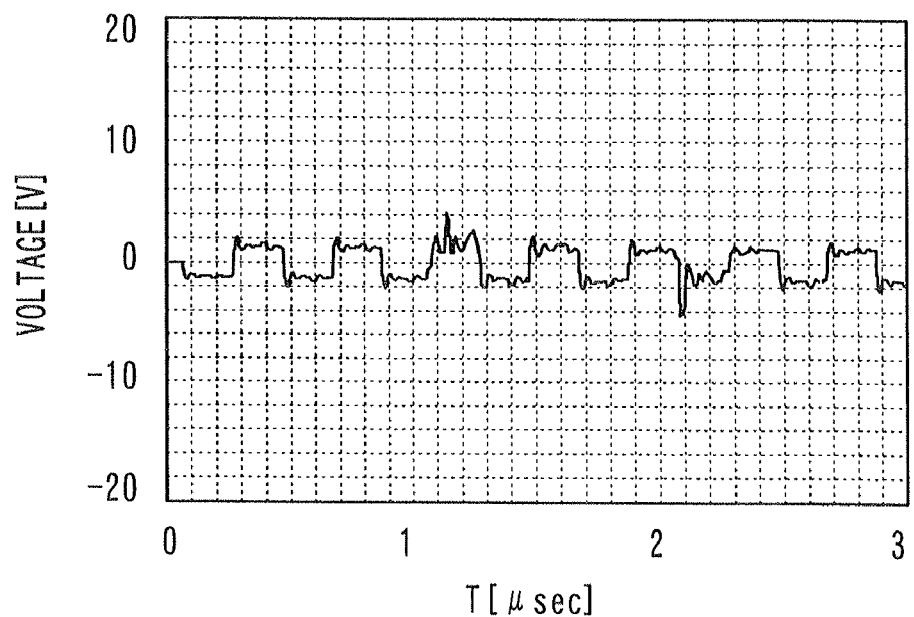

FIG. 2A shows the result of the simulation when the noise protection circuit 10 is not provided to the transmission lines L1, L2. FIG. 2B shows the result of the simulation when the noise protection circuit 10 is provided to the transmission lines L1, L2 like the first embodiment.

As can be seen from FIG. 2A, when the noise protection circuit 10 is not provided to the transmission lines L1, L2, the common mode noise introduced from the noise generator clearly appears in a differential communication voltage waveform so that the differential communication voltage waveform can be disturbed. In contrast, as can been seen from FIG. 2B, when the noise protection circuit 10 is provided to the transmission lines L1, L2, disturbance in the differential communication voltage waveform becomes small enough to achieve differential communication normally. In this way, the result of the simulation indicates that the differential communication transmission apparatus according to the first embodiment can achieve differential communication without being affected by the common mode noise.

Modifications

The first embodiment described above can be modified in various ways. A first modification of the first embodiment is described below with reference to FIG. 4. In the noise protection circuit 10 shown in FIG. 1, the negative noise protection circuit 14 is connected between the transmission line L1 (or L2) and the power line Lv so as to operate based on the potential of the power line Lv. Alternatively, the negative noise protection circuit 14 can be configured, for example, as shown in FIG. 4, so as to operate based on the potential of the ground line GND.

Figure 4:
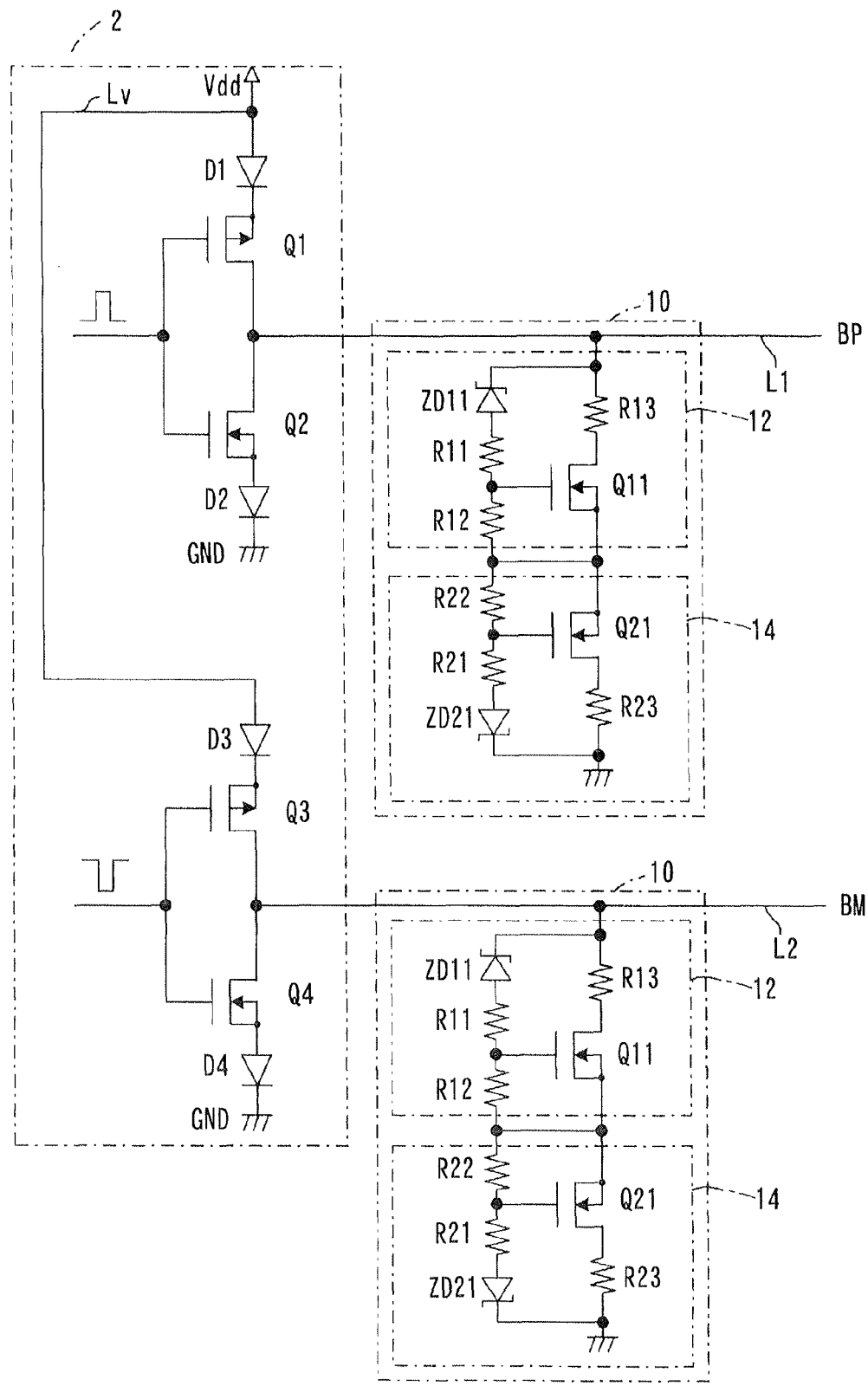
FIG. 4 is a diagram illustrating an electrical schematic of a differential communication transmission apparatus according to a first modification of the first embodiment.

The negative noise protection circuit 14 shown in FIG. 4 is connected between the positive noise protection circuit 12 and the ground line GND and reversed in polarity compared to the negative noise protection circuit 14 shown in FIG. 1.

Specifically, as shown in FIG. 4, the cathode of the Zener diode ZD21 is connected to the ground line GND. The resistors R21, R22 are connected in series between the anode of the Zener diode ZD21 and one end of the resistor R12 of the positive noise protection circuit 12. The drain of the MOSFET Q21 is connected through the resistor R23 to the ground line GND. The source of the MOSFET Q21 is connected to the source of the MOSFET Q11 of the positive noise protection circuit 12. In this way, the negative noise protection circuit 14 shown in FIG. 4 is connected between the positive noise protection circuit 12 and the ground line GND.

In this case, as shown in FIG. 4, at a node between the positive noise protection circuit 12 and the negative noise protection circuit 14, the resistor R12 is connected to the source of the MOSFET Q11, and the resistor R22 is connected to the source of the MOSFET Q21.

According to the first modification shown in FIG. 4, if the potential of the transmission line L1 (or L2) becomes outside the predetermined potential range corresponding to the power-supply voltage range of from 0 to Vdd, breakdown current flows through the Zener diode ZD11 or ZD21 so that the MOSFET Q11 or the MOSFET Q21 can be turned ON. Thus, the impedance of the transmission line L1 (or L2) with respect to the ground line GND can become equal to the impedance of the transmission line L2 (or L1) with respect to the ground line GND Alternatively, the negative noise protection circuit 14 shown in FIG. 1 can be configured to operate based on the potential of the ground line GND by connecting the cathode of the Zener diode ZD21 and one end of the resistor R23 to the ground line GND instead of the power line Lv.

Figure 5:
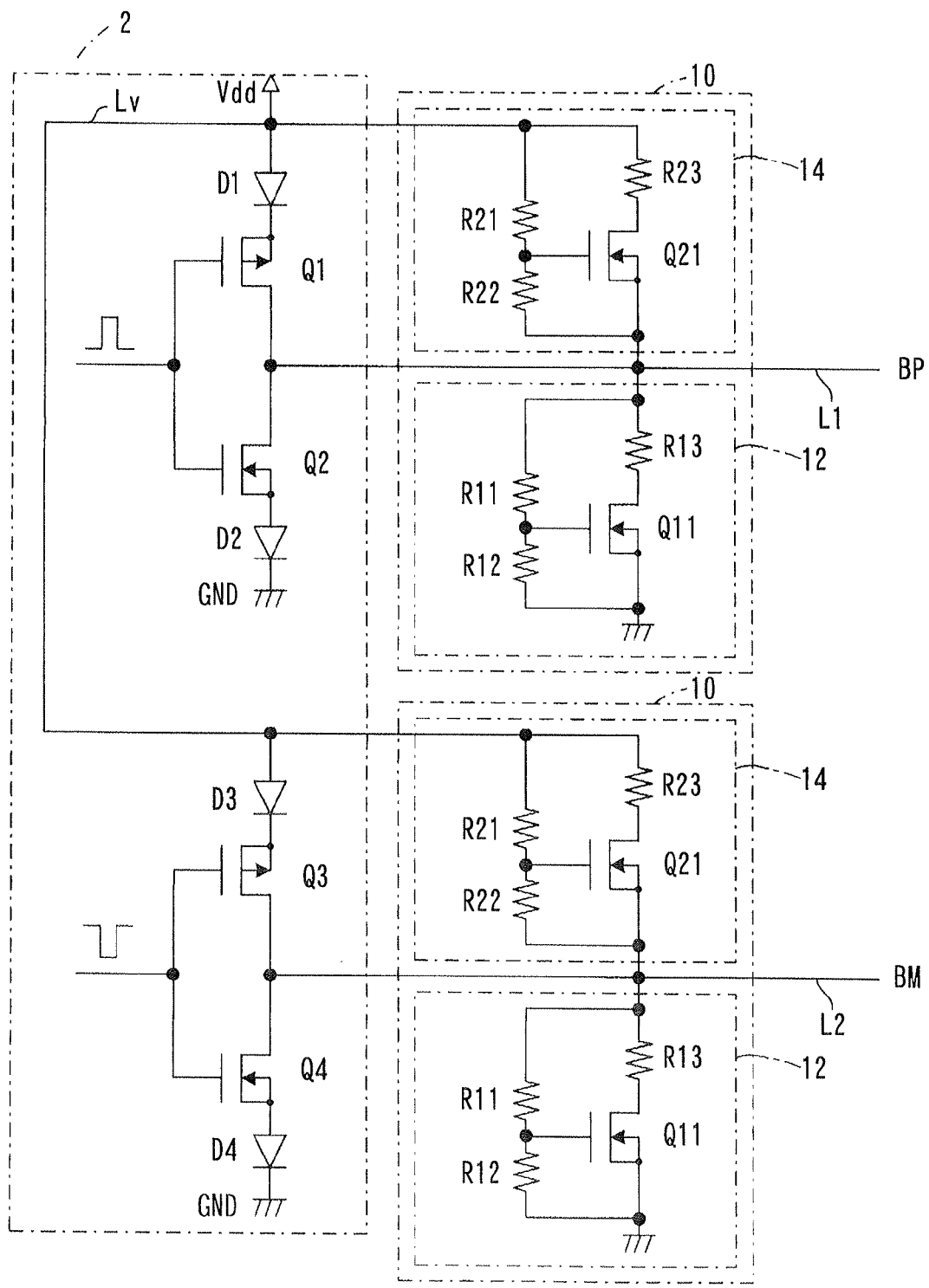
FIG. 5 is a diagram illustrating an electrical schematic of a differential communication transmission apparatus according to a second modification of the first embodiment.

A second modification of the first embodiment is described below with reference to FIG. 5. The second modification shown in FIG. 5 differs from the first embodiment shown in FIG. 1 in that the Zener diodes ZD11, ZD22 are removed from the positive noise protection circuit 12 and the negative noise protection circuit 14, respectively.

Figure 6:
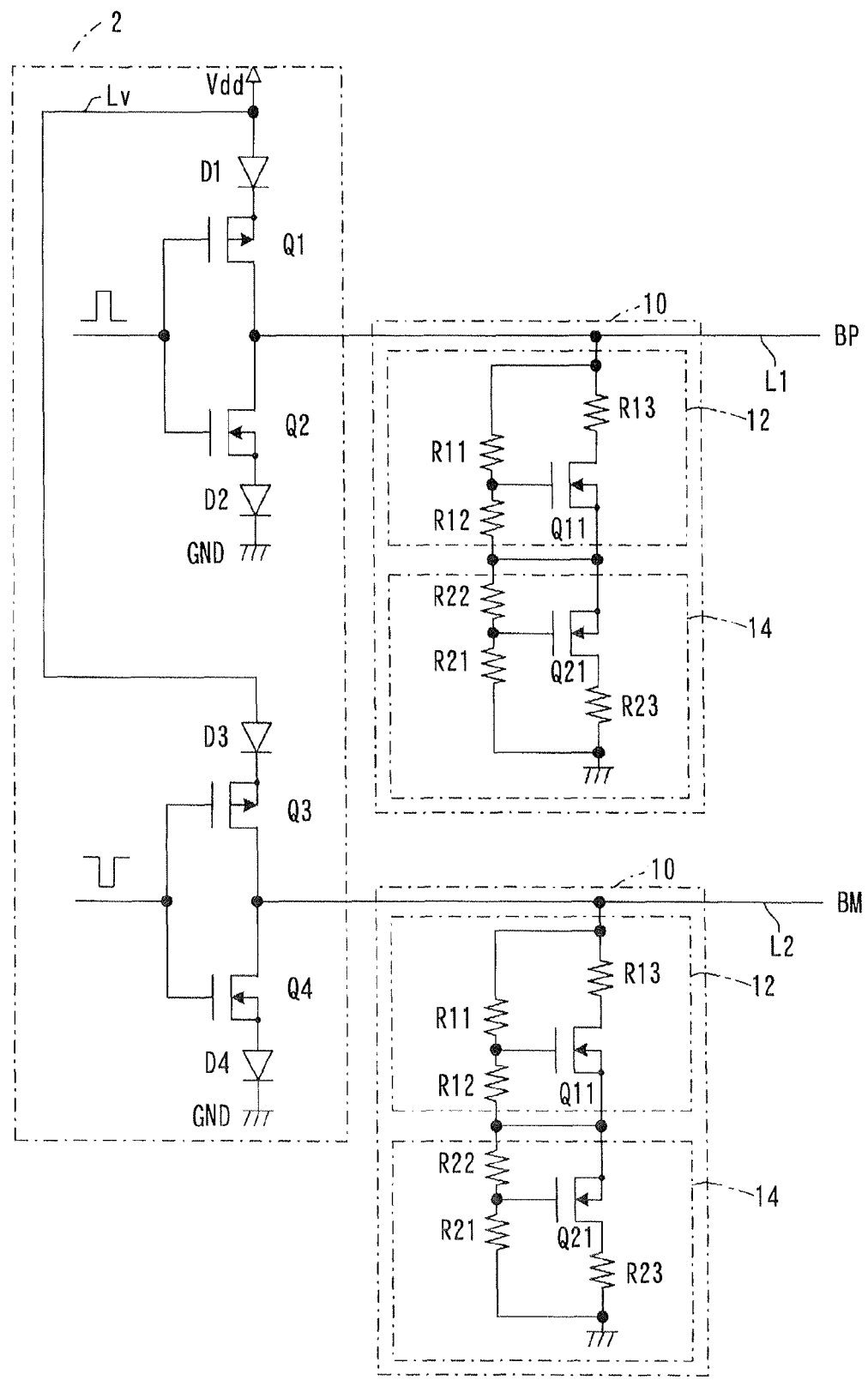
FIG. 6 is a diagram illustrating an electrical schematic of a differential communication transmission apparatus according to a third modification of the first embodiment.

A third modification of the first embodiment is described below with reference to FIG. 6. The third modification shown in FIG. 6 differs from the first modification shown in FIG. 6 in that the Zener diodes ZD11, ZD22 are removed from the positive noise protection circuit 12 and the negative noise protection circuit 14, respectively.

That is, the Zener diodes ZD11, ZD22 are not essential.

According to the second and third modifications of the first embodiment, a voltage divided by a voltage divider circuit formed with the resistors R11, R12 is always applied to the gate of the MOSFET Q11, and a voltage divided by a voltage divider circuit formed with the resistors R21, R22 is always applied to the gate of the MOSFET Q21. In this case, voltage divisional ratios of the voltage divider circuits are set in such a manner that the MOSFETs Q11, Q21 can be turned ON when the potentials of the transmission lines L1, L2 become outside the predetermined potential range.

Second Embodiment

Figure 7:
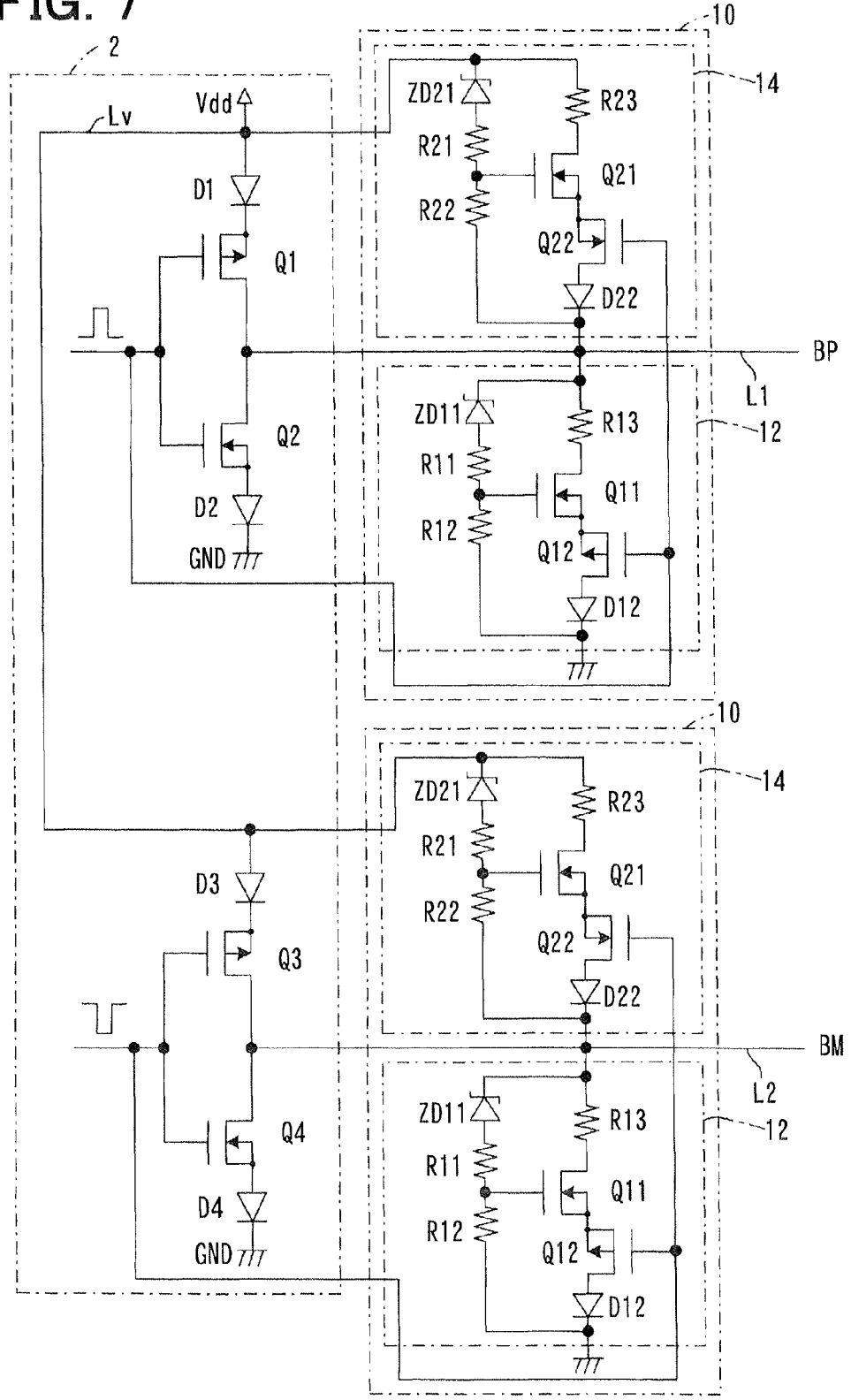
FIG. 7 is a diagram illustrating an electrical schematic of a differential communication transmission apparatus according to a second embodiment of the present invention.

A differential communication transmission apparatus according to a second embodiment of the present invention is described below with reference to FIG. 7.

The second embodiment shown in FIG. 7 differs from the first embodiment shown in FIG. 1 in the following points. A P-channel MOSFET Q12 and a diode D12 are connected in series between the MOSFET Q11 of the positive noise protection circuit 12 and the ground line GND. A N-channel MOSFET Q22 and a diode D22 are connected in series between the MOSFET Q21 of the negative noise protection circuit 14 and the transmission line L1 (or L2).

A first communication signal inputted to the gate of the MOSFET Q1 (or Q3) of the driver bridge circuit 2 is inputted to a gate of the MOSFET Q12 of the positive noise protection circuit 12. That is, the same communication signal is inputted to the gate of the MOSFET Q1 (or Q3) and the gate of the MOSFET Q12.

A second communication signal inputted to the gate of the MOSFET Q2 (or Q4) of the driver bridge circuit 2 is inputted to a gate of the MOSFET Q22 of the negative noise protection circuit 14. That is, the same communication signal is inputted to the gate of the MOSFET Q2 (or Q4) and the gate of the MOSFET Q22.

An anode of the diode D12 is connected to a drain of the MOSFET Q12, and a cathode of the diode D12 is connected to the ground line GND. Thus, the diode D12 prevents electric current to flow from the ground line GND to the transmission line L1 through the MOSFETs Q11, Q12. An anode of the diode D22 is connected to a drain of the MOSFET Q22, and a cathode of the diode D22 is connected to the transmission line L1. Thus, the diode D22 prevents electric current to flow from the transmission line L1 to the power line Lv through the MOSFETs Q21, Q22.

According to the second embodiment, the MOSFET Q12 of the positive noise protection circuit 12 is turned ON and OFF in conjunction with the MOSFET Q1 (or Q3) of the driver bridge circuit 2. Therefore, it is possible to prevent the MOSFET Q11 from being turned ON, when the gate potential of the MOSFET Q11 is increased by electric current flowing through the Zener diode ZD11 and the resistors R11, R12 under the condition that the MOSFET Q1 (or Q3) is OFF, in other words, under the condition that the MOSFET Q2 (or Q4) is ON.

Further, according to the second embodiment, the MOSFET Q22 of the negative noise protection circuit 14 is turned ON and OFF in conjunction with the MOSFET Q2 (or Q4) of the driver bridge circuit 2. Therefore, it is possible to prevent the MOSFET Q21 from being turned ON, when the gate potential of the MOSFET Q21 is increased by electric current flowing through the Zener diode ZD21 and the resistors R21, R22 under the condition that the MOSFET Q2 (or Q4) is OFF, in other words, under the condition that the MOSFET Q1 (or Q3) is ON.

It is noted that there is a possibility that the potentials of the transmission lines L1, L2 with respect to the ground line GND will exceed the upper limit potential at the same time (or fall below the lower limit potential at the same time) depending on a level of common mode noise superimposed on the transmission lines L1, L2. In such a case, the positive noise protection circuits 12 provided to the transmission lines L1, L2 or the negative noise protection circuits 14 provided to the transmission lines L1, L2 may be activated at the same time.

To prevent this problem, according to the second embodiment, when the power line Lv-side MOSFET Q1 (or Q3) of the driver bridge circuit 2 is turned ON, the MOSFET Q12 of the positive noise protection circuit 12 provided to the transmission line L1 (or L2) corresponding to the MOSFET Q1 (or Q3) is turned ON so as to allow the positive noise protection circuit 12 to be activated. Likewise, when the ground line GND-side MOSFET Q2 (or Q4) of the driver bridge circuit 2 is turned ON, the MOSFET Q22 of the negative noise protection circuit 14 provided to the transmission line L1 (or L2) corresponding to the MOSFET Q2 (or Q4) is turned ON so as to allow the negative noise protection circuit 14 to be activated.

In such an approach, since the positive noise protection circuits 12 provided to the transmission lines L1, L2 or the negative noise protection circuits 14 provided to the transmission lines L1, L2 are not activated at the same time, the transmission lines L1, L2 does not become the same potential at the same time. Therefore, differential transmission of data can be achieved normally.

Modifications

The second embodiment described above can be modified in various ways. A first modification of the second embodiment is described below with reference to FIG. 8. In the noise protection circuit 10 shown in FIG. 7, the negative noise protection circuit 14 is connected between the transmission line L1 (or L2) and the power line Lv so as to operate based on the potential of the power line Lv. Alternatively, the negative noise protection circuit 14 can be configured to operate based on the potential of the ground line GND.

Figure 8:
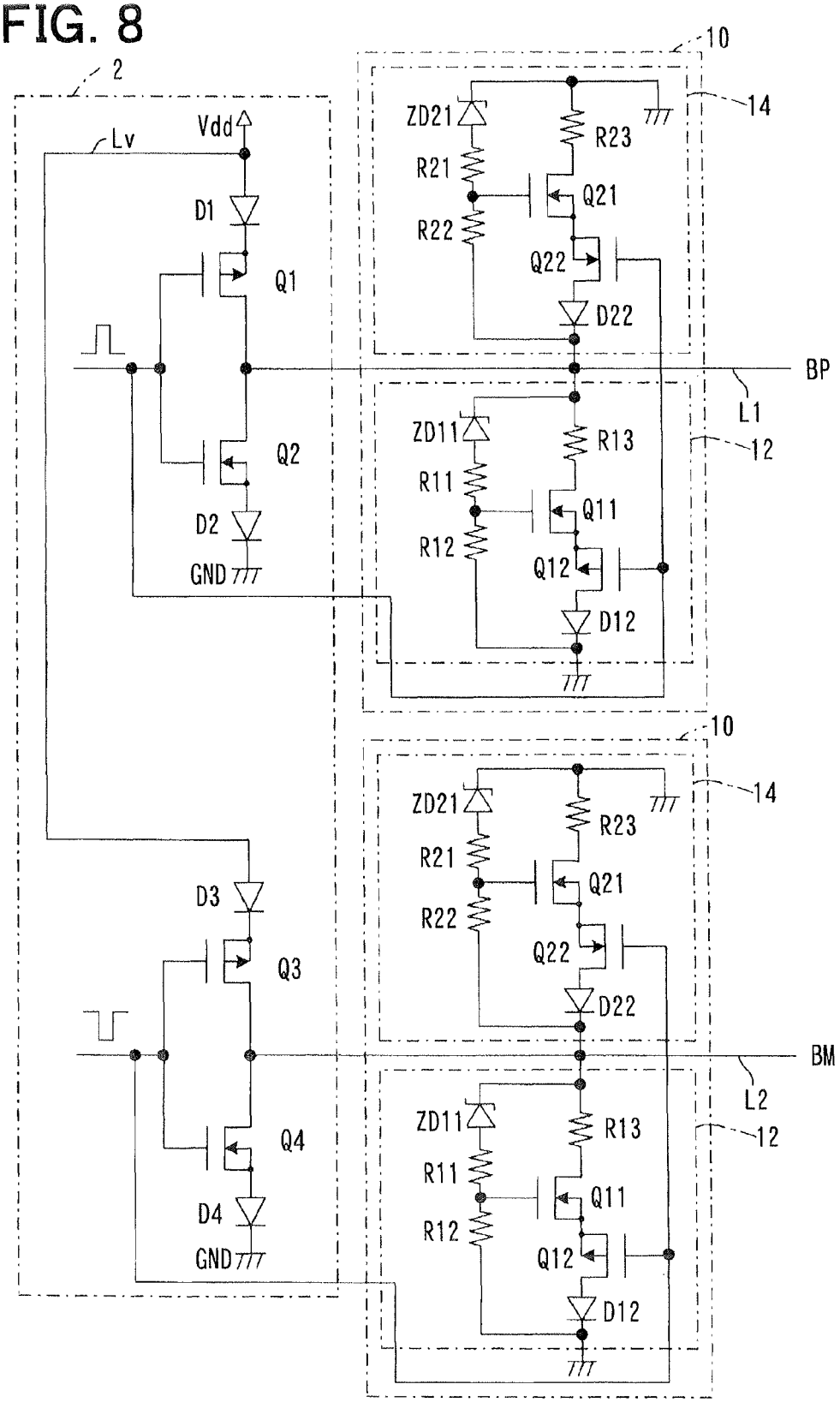
FIG. 8 is a diagram illustrating an electrical schematic of a differential communication transmission apparatus according to a first modification of the second embodiment.

In this case, for example, as shown in FIG. 8, the negative noise protection circuit 14 can be configured to operate based on the potential of the ground line GND by connecting the cathode of the Zener diode ZD21 and one end of the resistor R23 to the ground line GND instead of the power line Lv.

Figure 9:
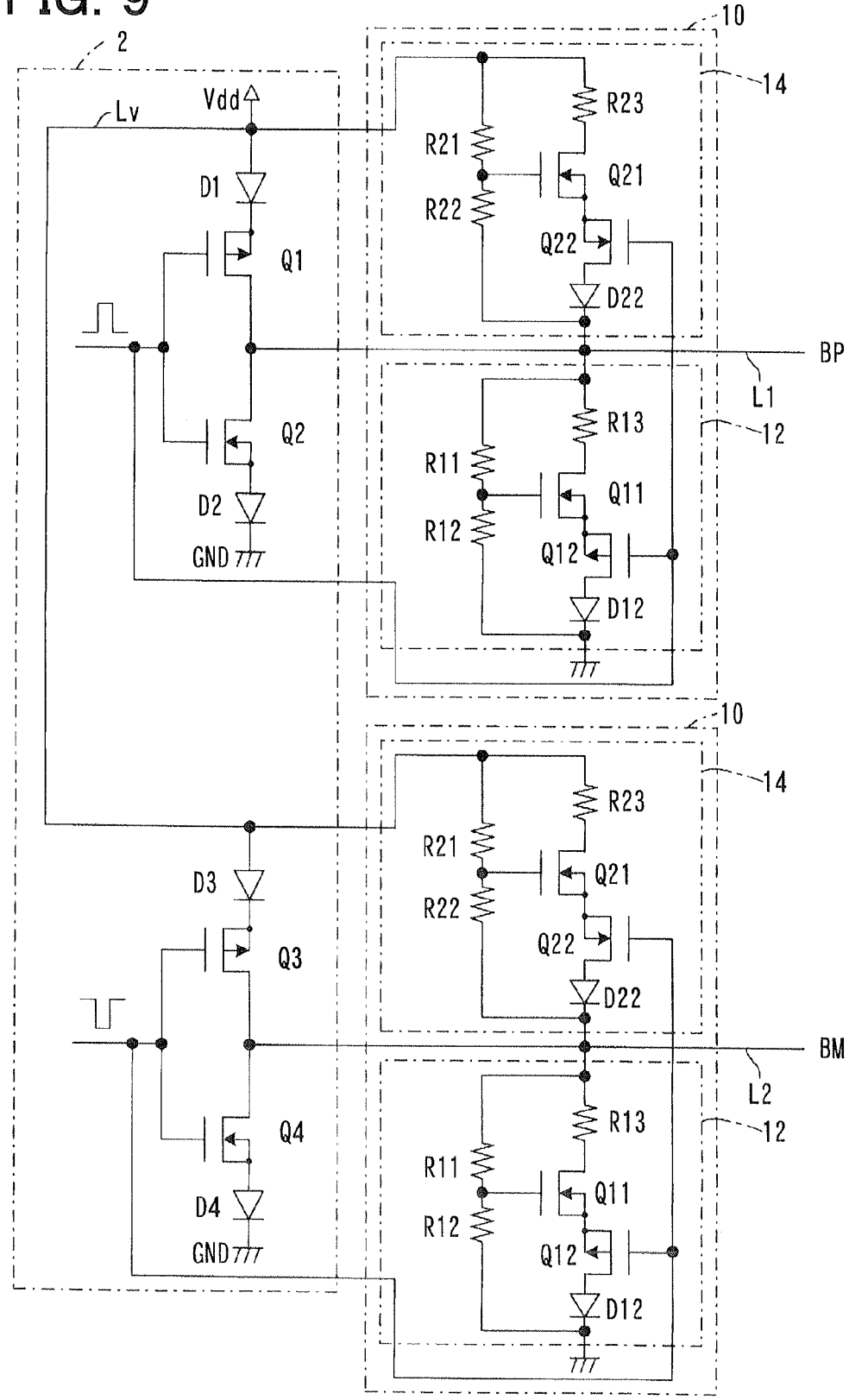
FIG. 9 is a diagram illustrating an electrical schematic of a differential communication transmission apparatus according to a second modification of the second embodiment.

A second modification of the second embodiment is described below with reference to FIG. 9. The second modification shown in FIG. 9 differs from the second embodiment shown in FIG. 7 in that the Zener diodes ZD11, ZD22 are removed from the positive noise protection circuit 12 and the negative noise protection circuit 14, respectively.

Figure 10:
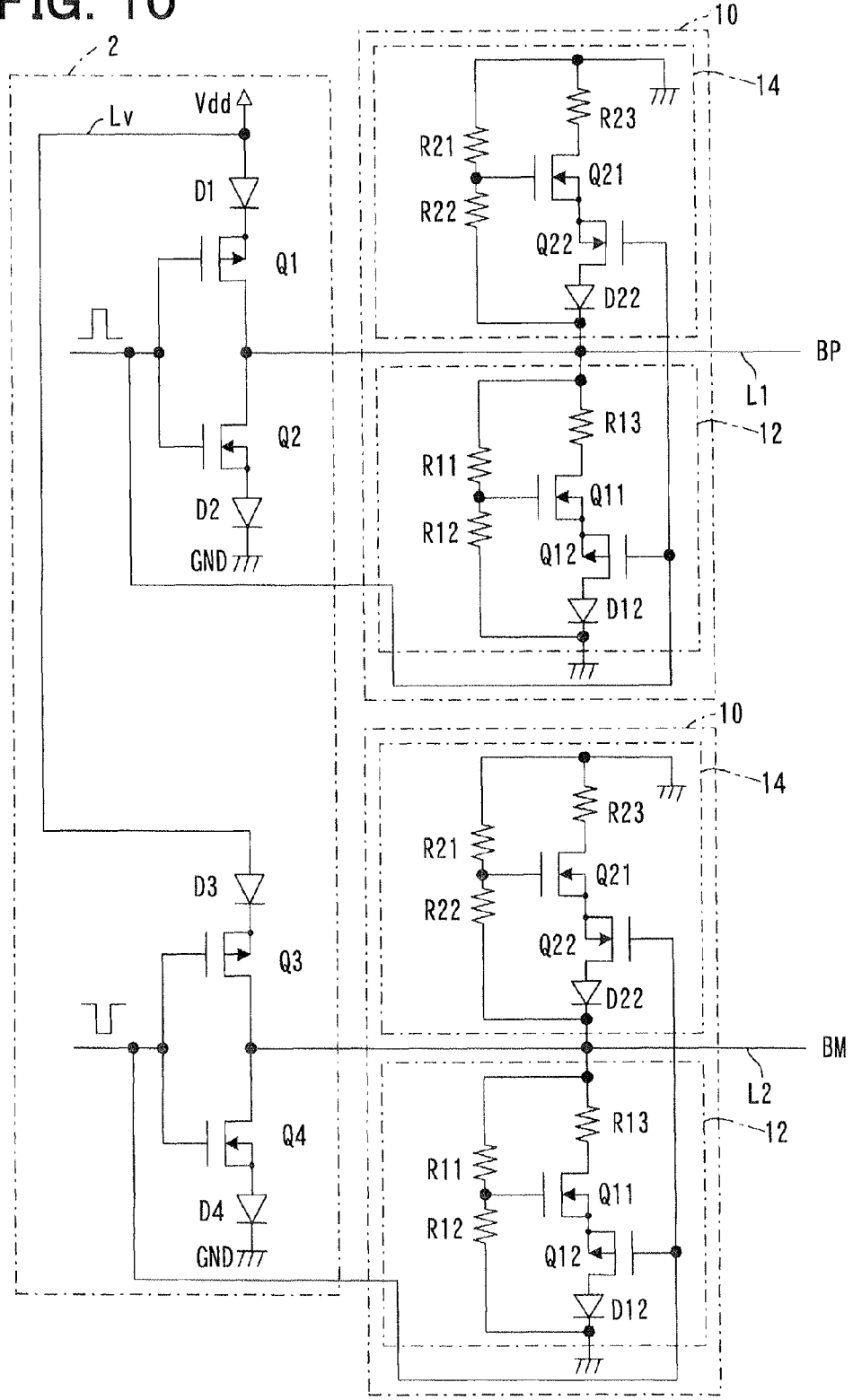
FIG. 10 is a diagram illustrating an electrical schematic of a differential communication transmission apparatus according to a third modification of the second embodiment.

A third modification of the second embodiment is described below with reference to FIG. 10. The third modification shown in FIG. 10 differs from the first modification shown in FIG. 8 in that the Zener diodes ZD11, ZD22 are removed from the positive noise protection circuit 12 and the negative noise protection circuit 14, respectively.

That is, the Zener diodes ZD11, ZD22 are not essential.

According to the second and third modifications of the second embodiment, a voltage divided by a voltage divider circuit formed with the resistors R11, R12 is always applied to the gate of the MOSFET Q11, and a voltage divided by a voltage divider circuit formed with the resistors R21, R22 is always applied to the gate of the MOSFET Q21. In this case, voltage divisional ratios of the voltage divider circuits are set in such a manner that the MOSFETs Q11, Q21 can be turned ON when the potentials of the transmission lines L1, L2 become outside the predetermined potential range.

Third Embodiment

Figure 11:
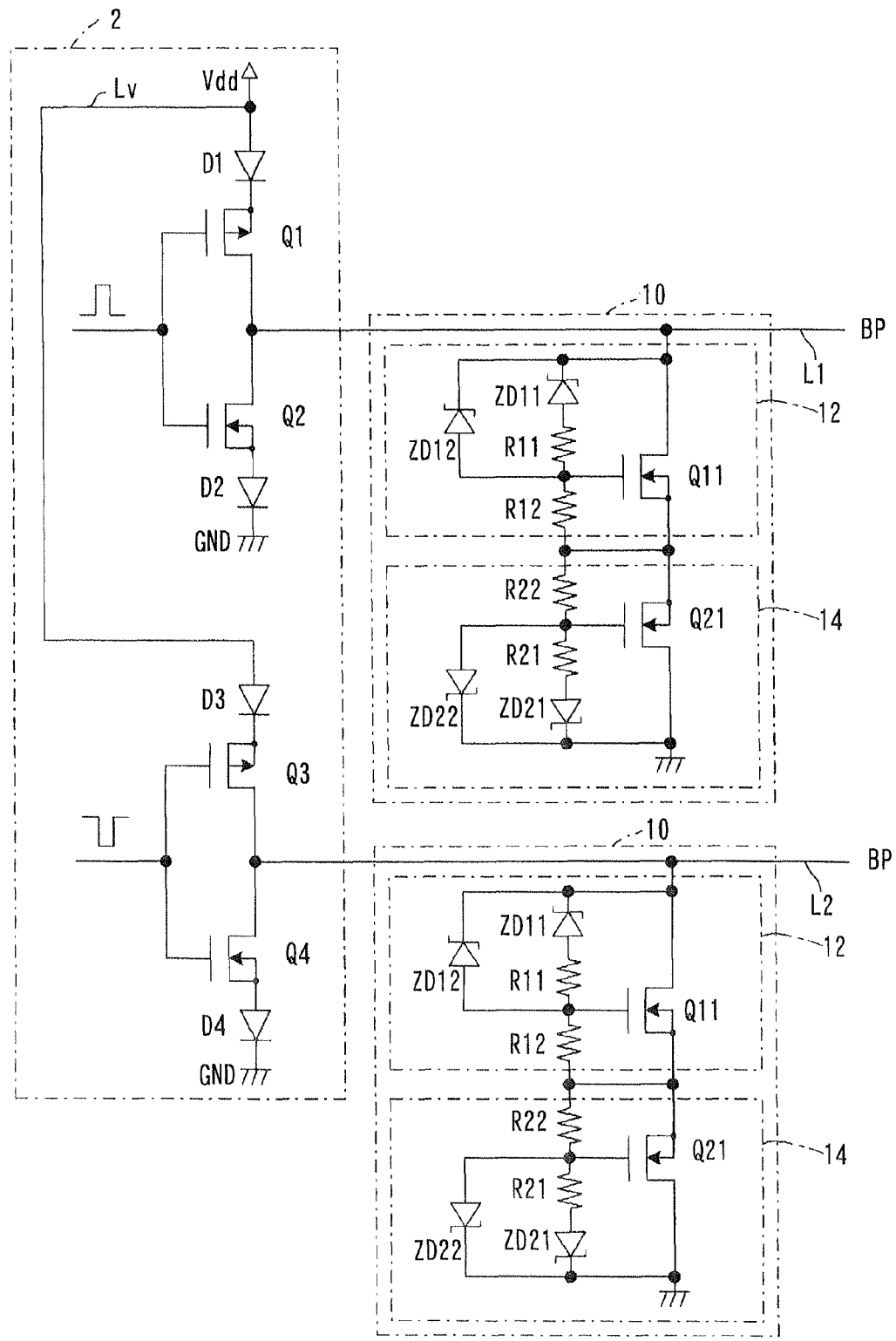
FIG. 11 is a diagram illustrating an electrical schematic of a differential communication transmission apparatus according to a third embodiment of the present invention.

A differential communication transmission apparatus according to a third embodiment of the present invention is described below with reference to FIG. 11.

The third embodiment shown in FIG. 11 differs from the first modification of the first embodiment shown in FIG. 4 in the following points. One point is that the resistors R13, R23 connected in series with the MOSFETs Q11, Q21 are removed from the positive noise protection circuit 12 and the negative noise protection circuit 14, respectively. The other point is that Zener diodes ZD12, ZD22 are connected in parallel with a series circuit of the Zener diode ZD11 and the resistor R11 and a series circuit of the Zener diode ZD21 and the resistor R21, respectively.

The Zener diodes ZD12, ZD22 can serve as a static electricity detector for detecting static electricity applied to the transmission line L1 (or L2).

The cathode of the Zener diode ZD12 is connected to the cathode of the Zener diode ZD11, and the anode of the Zener diode ZD12 is connected to one end of the resistor R11. Thus, the Zener diode ZD12 is connected in parallel with the Zener diode ZD11 in the same direction. The cathode of the Zener diode ZD22 is connected to the cathode of the Zener diode ZD21, and the anode of the Zener diode ZD22 is connected to one end of the resistor R21. Thus, the Zener diode ZD22 is connected in parallel with the Zener diode ZD21 in the same direction.

Breakdown voltages of the Zener diodes ZD12, ZD22 are set greater than breakdown voltages of the Zener diodes ZD11, ZD21, respectively. In such an approach, the Zener diodes ZD12, ZD22 can turn ON the MOSFETs Q11,Q21 by detecting static electricity higher than inductive noise such as common mode noise.

According to the third embodiment, when the potential of the transmission line L1 (or L2) becomes outside the predetermined potential range due to common mode noise, breakdown current flows through the Zener diode ZD11 or the Zener diode ZD21 so that the MOSFET Q11 or the MOSFET Q21 can be turned ON. Further, even when positive or negative static electricity occurs in the transmission line L1 (or L2), breakdown current flows through the Zener diode ZD11 or the Zener diode ZD21 so that the MOSFET Q11 or the MOSFET Q21 can be turned ON.

When one of the MOSFET Q11 and the MOSFET Q21 is turned ON by the breakdown current flowing through the Zener diode ZD11 or the Zener diode ZD21, electric current flows between the transmission line L1 (or L2) and the ground line GND through a parasitic diode (not shown) formed between the drain and the source of the other of the MOSFET Q11 and the MOSFET Q21. Thus, the static electricity can be promptly discharged to the ground line GND.

The first, second, and third embodiments described above can be modified in various ways. For example, the MOSFETs of the driver bridge circuit 2 and the noise protection circuit 10 can be replaced with other types of transistors such as bipolar transistors.

In the third embodiment, like the second modification of the first embodiment shown in FIG. 4, the negative noise protection circuit 14 is connected in series with the ground line GND-side of the positive noise protection circuit 12. Alternatively, like the second modification of the second embodiment shown in FIG. 9, the negative noise protection circuit 14 can be connected in parallel with the positive noise protection circuit 12 between the transmission lines L1, L2, and the ground line GND.

Summary

Figure 12:
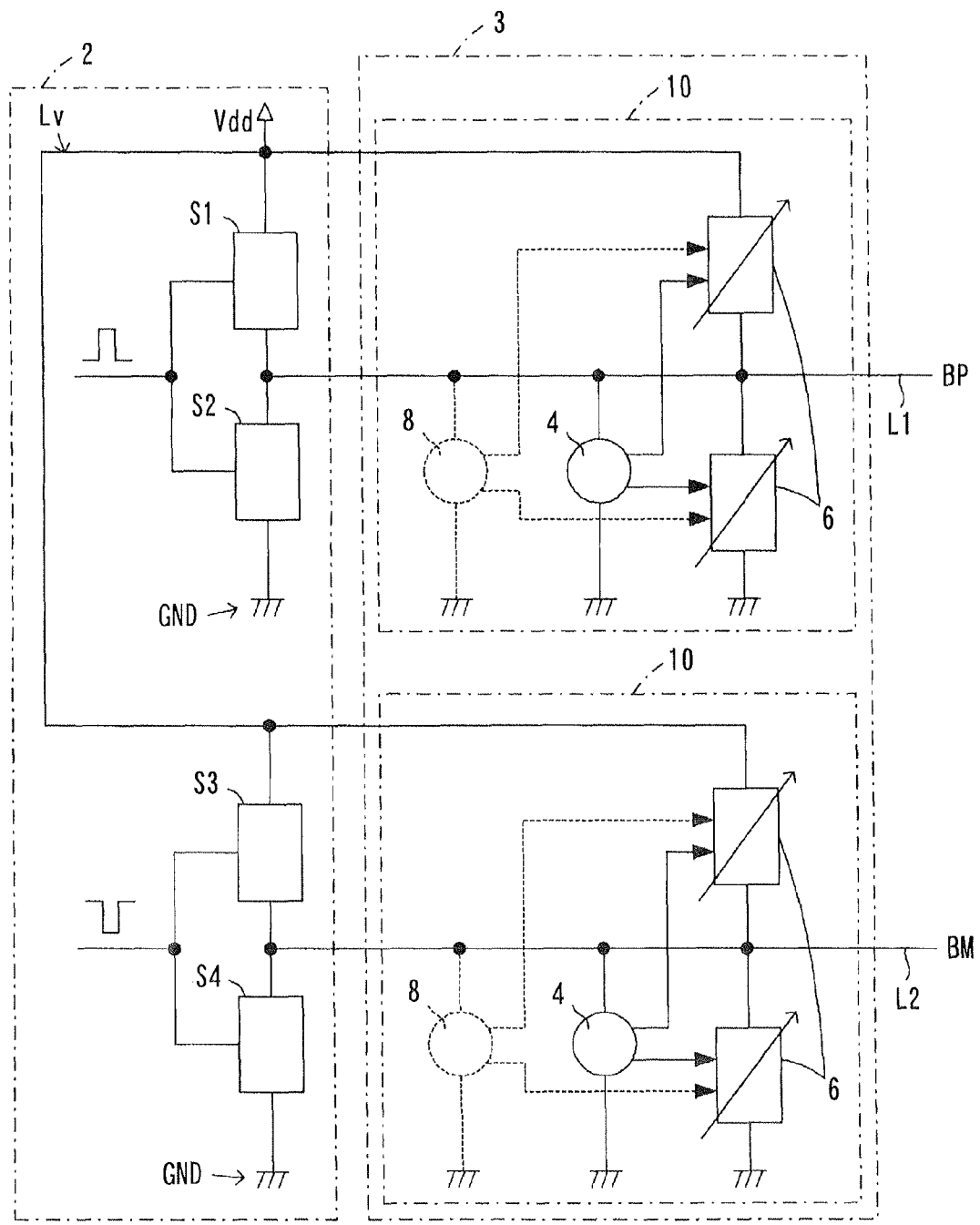
FIG. 12 is a block diagram of a differential communication transmission apparatus according to the present invention.

A differential communication transmission apparatus according to the present invention can be summarized as follows with reference to FIG. 12. As shown in FIG. 12, the differential communication transmission apparatus includes a driver bridge circuit 2 and a noise reduction device 3. The driver bridge circuit 2 includes four output devices S1-S4. The first output device S1 is connected between the power line Lv and the first transmission line L1. The second output device S2 is connected between the first transmission line L1 and the ground line GND. The third output device S3 is connected between the power line Lv and the second transmission line L2. The fourth output device S4 is connected between the second transmission line L2 and the ground line GND. The noise reduction device 3 reduces noise superimposed on the first and second transmission lines L1, L2.

The noise reduction device 3 includes a pair of noise protection circuits 10, each of which is provided to a corresponding one of the first and second transmission lines L1, L2. Each noise protection circuit 10 includes a ground potential detector 4 and an impedance controller 6. The ground potential detector 4 detects a ground potential of the first and second transmission lines L1, L2 with respect to the ground line GND. When the detected potential becomes outside a predetermined potential range of from a lower limit potential to an upper limit potential that are set based on the power-supply voltage Vdd, the impedance controller 6 causes an impedance of the transmission line L1 (or L2) with respect to the ground line GND to become equal to an impedance of the transmission line L2 (or L1) with respect to the ground line GND.

When the potential of one of the transmission lines L1, L2 becomes higher than the power line Lv or becomes lower than the ground line GND during differential transmission of data due to common mode noise superimposed on the transmission lines L1, L2, the ground potential detected by the ground potential detector 4 provided to the one of the transmission lines L1, L2 rises or falls. In this case, the impedance controller 6 determines that the detected potential becomes outside the predetermined potential range and causes the impedance of the one of the transmission lines L1, L2 to become equal to the impedance of the other of the transmission lines L1, L2.

In such an approach, even if common mode noise is superimposed on the transmission lines L1, L2, the potentials of the transmission lines L1, L2 are kept within the predetermined potential range so that the driver bridge circuit 2 can perform the differential transmission of data normally.

For example, assuming that positive common mode noise beyond a power-supply voltage range of 0 to Vdd is superimposed on the transmission lines L1, L2 under the conditions that the output devices S1, S4 are ON, and the output devices S2, S3 are OFF, electric current does not flow through the output device S1 from the power line Lv to the transmission line L1 so that the transmission line L1 will become open-circuited. As a result, the impedances of the transmission lines L1, L2 with respect to the ground line GND become unbalanced so that the differential transmission of data cannot be achieved normally.

In such a case, the ground potential detector 4 detects the potentials of the transmission lines L1, L2 with respect to the ground line GND, and when the detected potentials become outside the predetermined potential range, the impedance controller 6 causes the impedances of the transmission lines L1, L2 with respect o the ground line GND to become equal to each other. For example, when the potential of the transmission line L1 rises due to the common mode noise, the ground potential detector 4 provided to the transmission line L1 detects the rise in the potential of the transmission line L1, and then the impedance controller 6 provided to the transmission line L1 causes the impedance of the transmission line L1 with respect to the ground line GND to become equal to the impedance of the transmission line L2 with respect to the ground line GND. Thus, the driver bridge circuit 2 can perform the differential transmission of data normally. It is noted that the impedance of the transmission line L2 with respect to the ground line GND depends on a characteristic (on-resistance) of the output device S4 connected to the transmission line L2.

As described above, the ground potential detector 4 is provided to each of the transmission lines L1, L2 to detect the potential of each of the transmission lines L1, L2 with respect to the ground line GND. A voltage change in each of the transmission lines L1, L2 due to the common mode noise is determined based on the potential detected by the ground potential detector 4. Therefore, the ground potential detector 4 is not required to have high impedance. For example, the ground potential detector 4 can be formed with a resistor having low impedance.

The ground potential detector 4 can allow tracking of common mode node that rises at high speed. Therefore, for example, even when high speed common mode noise with a rising edge of about 100 MHz occurs, the differential transmission of data can be achieved normally.

Further, since there is no need to add a common mode choke coil or a filter circuit for attenuating common mode noise to the transmission lines L1, L2, the differential communication transmission apparatus as a whole can be reduced in size.

The impedance controller 6 serves to control the impedance of the transmission line L1 (or L2) to which electric current cannot flow through the outputs devices S1, S2 (or S3, S4) due to the common mode noise superimposed on the transmission line L1 (or L2). Therefore, for example, the impedance controller 6 can be formed with a pair of transistors or a pair of series circuit, each of which includes a transistor and a resistor. Each transistor or each series circuit of the transistor and the resistor is connected between the transmission line L1 (or L2) and the ground line GND or the power line Lv. Thus, the impedance controller 6 can be simplified in configuration.

In this case, electric current can flow through the transistor to the transmission line L1 (or L2), the potential of which exceeds or falls below the predetermined potential range due to the common mode noise. Therefore, the impedance of the transmission line L1 (or L2) can be controlled to a predetermined impedance that depends on the on-resistance of the transistor or a combined resistance of the series circuit of the transistor and the resistor.

When the impedance controller 6 is configured in the above manner, the transistor can be driven by comparing the potential of the transmission lines L1, L2 with the upper and lower limit potentials by using a comparator. However, in this case, since the comparator may degrade control responsivity, control delay may occur when the common mode noise rises at high speed.

To prevent this problem, when the impedance controller 6 is formed with the pair of transistors or the pair of series circuit of the transistor and the resistor, it is preferable that a control voltage applied to a control terminal of the transistor should be generated directly from the common mode noise.

Specifically, the ground potential detector 4 includes a pair of voltage divider circuits. Each divider circuit is formed with resistors connected in series and connected between the transmission line L1 (or L2) and the ground line GND or the power line Lv. The ground potential detector 4 detects whether the potential of the transmission line L1 (or L2) with respect to the ground line GND exceeds or falls below the predetermined voltage range based on a voltage divided by each divider circuit.

The voltage divided by each divider circuit of the ground potential detector 4 is applied to a control terminal of a corresponding one of the pair of transistors of the impedance controller 6. When the potential of the transmission line L1 (or L2) with respect to the ground line GND is greater than the upper limit potential, one of the pair of transistors is driven to control the impedance of the transmission line L1 (or L2) with respect to the ground line GND. When the potential of the transmission line L1 (or L2) with respect to the ground line GND is less than the lower limit potential, the other of the pair of transistors is driven to control the impedance of the transmission line L1 (or L2) with respect to the ground line GND.

As described above, since the ground potential detector 4 and the impedance controller 6 can be implemented as an analog circuit using a resistor, a transistor, and/or a Zener diode, there is no need to add a comparator to detect the potential with respect to the ground line GND. Therefore, the impedance controller 6 (specifically, transistor) can respond to the common mode noise superimposed on the transmission lines L1, L2 without delay.

It is noted that when the impedance controller 6 is configured in the above manner, the potentials of the transmission lines L1, L2 may exceed the upper limit potential (or fall below the lower limit potential) at the same time. In such a case, transistors for allowing electric currents to flow to the transmission lines L1, L2 in the same direction may be turned ON at the same time.

As a result, the ground potentials of the transmission lines L1, L2 with respect to the ground line GND become the same potential so that the driver bridge circuit 2 cannot achieve the differential transmission of data normally.

To prevent this problem, it is preferable that the impedance controller 6 includes a first switching device connected in series with the one of the pair of transistors and a second switching device connected in series with the other of the pair of transistors. The first switching device is turned ON and OFF in conjunction with the output device S1 (or S3) that is connected between the power line Lv and the transmission line L1 (or L2). The second switching device is turned ON and OFF in conjunction with the output device S2 (or S4) that is connected between the transmission line L1 (or L2) and the ground line GND.

In such an approach, the one of the pair of transistors of one of the pair of noise protection circuits 10 is not turned ON at the same time as the one of the pair of transistors of the other of the pair of noise protection circuits 10. Likewise, the other of the pair of transistors of one of the pair of noise protection circuits 10 is not turned ON at the same time as the other of the pair of transistors of the other of the pair of noise protection circuits 10. Thus, since the transmission lines L1, L2 do not become the same potential at the same time, the differential transmission of data can be achieved normally.

Further, the pair of transistors of the impedance controller 6 can be connected directly between the transmission line L1 (or L2) and the ground line GND.

In this case, as indicated by a broken line in FIG. 12, each noise protection circuit 10 can include a static electricity detector 8 in addition to the ground potential detector 4. The static electricity detector 8 detects positive and negative static electricity applied to the transmission line L1 (or L2). The static electricity detector 8 discharges the detected static electricity to the ground line GND by turning ON one of the pair of transistors of the impedance controller 6 according to a polarity of the detected static electricity.

In such an approach, when the potential of the transmission line L1 (or L2) becomes outside the predetermined potential range, the on-resistance of the transistors of the impedance controller 6 is adjusted by an output of the ground potential detector 4 so that the impedance of the transmission line L1 (or L2) with respect to the ground line GND can become equal to the impedance of the transmission line L2 (or L1) with respect to the ground line GND. Further, when static electricity occurs in the transmission line L1 (or L2), the static electricity can be discharged to the ground line GND through the impedance controller 6 (specifically, transistor).

Such changes and modifications are to be understood as being within the scope of the present invention as defined by the appended claims.

What is claimed is:

1. A transmission apparatus for differential communication comprising:
    a driver bridge circuit including a first output device connected between a power line, supplied with a power-supply voltage from a direct current power supply, and a first transmission line, a second output device connected between the first transmission line and a ground line, a third output device connected between the power line and a second transmission line, and a fourth output device connected between the second transmission line and the ground line, the first and fourth output devices being paired to form a first output device pair, the second and third output devices being paired to from a second output device pair, the first and second output device pairs being alternately tuned ON and OFF in accordance with transmission data to perform differential transmission of the transmission data through the first and second transmission lines; and
    a noise reduction device configured to reduce noise superimposed on the first and second transmission lines, wherein
    the noise reduction device includes a pair of noise protection circuits, each noise protection circuit being provided to a corresponding one of the first and second transmission lines,
    each noise protection circuit includes a ground potential detector and an impedance controller,
    the ground potential detector detects a potential of the corresponding transmission line with respect to the ground line, and
    the impedance controller causes an impedance of the corresponding transmission line with respect to the ground line to become equal to an impedance of the other transmission line with respect to the ground line, when the detected potential becomes outside a predetermined potential range of from a lower potential limit to an upper potential limit that are set based on the power-supply voltage.

2. The transmission apparatus according to claim 1, wherein
    the ground potential detector includes a pair of voltage divider circuits, each voltage divider circuit being formed with resistors connected in series, each voltage divider circuit being connected between the corresponding transmission line and the power line or the ground line,
    the ground potential detector detects whether the potential of the corresponding transmission line with respect to the ground line exceeds or falls below the predetermined potential range based on a voltage divided by each voltage divider circuit,
    the impedance controller includes a pair of transistors corresponding to the pair of voltage divider circuits, each transistor being connected between the corresponding transmission line and the power line or the ground line,
    the voltage divided by each voltage divider circuit of the ground potential detector is applied to a control terminal of a corresponding one of the pair of transistors of the impedance controller,
    when the potential of the corresponding transmission line with respect to the ground line is greater than the upper limit potential, one of the pair of transistors is driven to control the impedance of the corresponding transmission line with respect to the ground line, and
    when the potential of the corresponding transmission line with respect to the ground line is less than the lower limit potential, the other of the pair of transistors is driven to control the impedance of the corresponding transmission line with respect to the ground line.

3. The transmission apparatus according to claim 2, wherein
    the impedance controller includes a first switching device connected in series with the one of the pair of transistors and a second switching device connected in series with the other of the pair of transistors,
    the first switching device is turned ON and OFF in conjunction with one of the first and third output devices of the driver bridge circuit, the one of the first and third output devices being connected between the power line and the corresponding transmission line, and
    the second switching device is turned ON and OFF in conjunction with one of the second and fourth output devices of the driver bridge circuit, the one of the second and fourth output devices being connected between the corresponding transmission line and the ground line.

4. The transmission apparatus according to claim 2, wherein the pair of transistors of the impedance controller are connected directly between the corresponding transmission line and the ground line, and each noise protection circuit includes a static electricity detector for detecting positive and negative static electricity applied to the corresponding transmission line, and the static electricity detector discharges the detected static electricity to the ground line by turning ON one of the pair of transistors of the impedance controller according to a polarity of the detected static electricity.

5. The transmission apparatus according to claim 2, wherein each voltage divider circuit of the ground potential detector includes a Zener diode connected in series with the resistors.

6. The transmission apparatus according to claim 2, wherein each transistor of the impedance controller is connected in series with a resistor.

* * * * *